US012699344B2

(12) United States Patent
Nishi

(10) Patent No.: US 12,699,344 B2
(45) Date of Patent: Aug. 4, 2026

(54) RECORDING MEDIUM TRANSPORT DEVICE AND IMAGE FORMING APPARATUS

(71) Applicant: FUJIFILM Business Innovation Corp., Tokyo (JP)

(72) Inventor: Kazune Nishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/069,259

(22) Filed: Mar. 4, 2025

(65) Prior Publication Data

US 2026/0056501 A1 Feb. 26, 2026

(30) Foreign Application Priority Data

Aug. 20, 2024 (JP) ................................ 2024-138906

(51) Int. Cl.
*G03G 15/00* (2006.01)

(52) U.S. Cl.
CPC .................. *G03G 15/6502* (2013.01); *G03G 2215/00924* (2013.01); *G03G 2215/0409* (2013.01)

(58) Field of Classification Search
CPC ..... G03G 15/6502; G03G 2215/00924; G03G 2215/0409
See application file for complete search history.

(56) References Cited

U.S. PATENT DOCUMENTS

| | | | | |
|---|---|---|---|---|
| 6,976,672 | B2 | 12/2005 | Kawata | |
| 7,451,970 | B2 | 11/2008 | Kawata | |
| 8,131,204 | B2 | 3/2012 | Kadota | |
| 2012/0319348 | A1* | 12/2012 | Oshiro | B65H 7/125 271/153 |

FOREIGN PATENT DOCUMENTS

| | | |
|---|---|---|
| JP | 2004107043 | 4/2004 |
| JP | 2004180667 | 7/2004 |
| JP | 2008033146 | 2/2008 |

* cited by examiner

*Primary Examiner* — David H Banh
(74) *Attorney, Agent, or Firm* — JCIPRNET

(57) ABSTRACT

A recording medium transport device includes a medium accommodation section that accommodates a recording medium, a medium path that is a path through which the recording medium fed out from the medium accommodation section passes, a merging path that merges with the medium path and that is a path through which the recording medium fed out from another accommodation section different from the medium accommodation section passes in a case of heading for the medium path, and a processor configured to transport the recording medium fed out from the medium accommodation section to an upstream side in the merging path through the merging path, reverse a transport direction of the recording medium, and transport the recording medium to the medium path.

15 Claims, 10 Drawing Sheets

RECORDING MEDIUM TRANSPORT DEVICE AND IMAGE FORMING APPARATUS

CROSS-REFERENCE TO RELATED APPLICATIONS

This application is based on and claims priority under 35 USC 119 from Japanese Patent Application No. 2024-138906 filed Aug. 20, 2024.

BACKGROUND

(i) Technical Field

The present invention relates to a recording medium transport device and an image forming apparatus.

(ii) Related Art

JP2008-33146A discloses processing in which, in a case of a front and back mode, unlike normal two-sided printing, an odd-numbered page is printed on one side of paper, the paper is reversed, an even-numbered page is printed on the other side, and the paper is reversed again and then discharged.

JP2004-107043A discloses a configuration in which a multi-inserter is provided with a paper feeding section that feeds a sheet from a left side and a paper feeding section that feeds a sheet from a right side, and a reversal operation of an insertion sheet is not required.

SUMMARY

In an apparatus that handles a recording medium such as paper, an accommodation section that accommodates the recording medium may be provided, and a space for reversing the recording medium fed out from the accommodation section may be provided. In a case in which a space for the reversal is provided, the apparatus is likely to increase in size as compared with a case in which the space is not provided.

Aspects of non-limiting embodiments of the present disclosure relate to a recording medium transport device and an image forming apparatus that can reduce a size of a device including a space for reversing front and back sides of a recording medium as compared with a case in which a dedicated space used only for reversing the front and back sides of the recording medium is secured and the front and back sides of the recording medium are reversed, or a case in which both a transport destination of the recording medium and the space for reversing the front and back sides of the recording medium are provided in one region of two regions that face each other with a plane interposed between the two regions, the plane extending in a feeding direction of the recording medium and passing through the recording medium.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording medium transport device including: a medium accommodation section that accommodates a recording medium; a medium path that is a path through which the recording medium fed out from the medium accommodation section passes; a merging path that merges with the medium path and that is a path through which the recording medium fed out from another accommodation section different from the medium accommodation section passes in a case of heading for the medium path; and a processor configured to transport the recording medium fed out from the medium accommodation section to an upstream side in the merging path through the merging path, reverse a transport direction of the recording medium, and transport the recording medium to the medium path.

BRIEF DESCRIPTION OF THE DRAWINGS

Exemplary embodiment(s) of the present invention will be described in detail based on the following figures, wherein.

Figure 4:
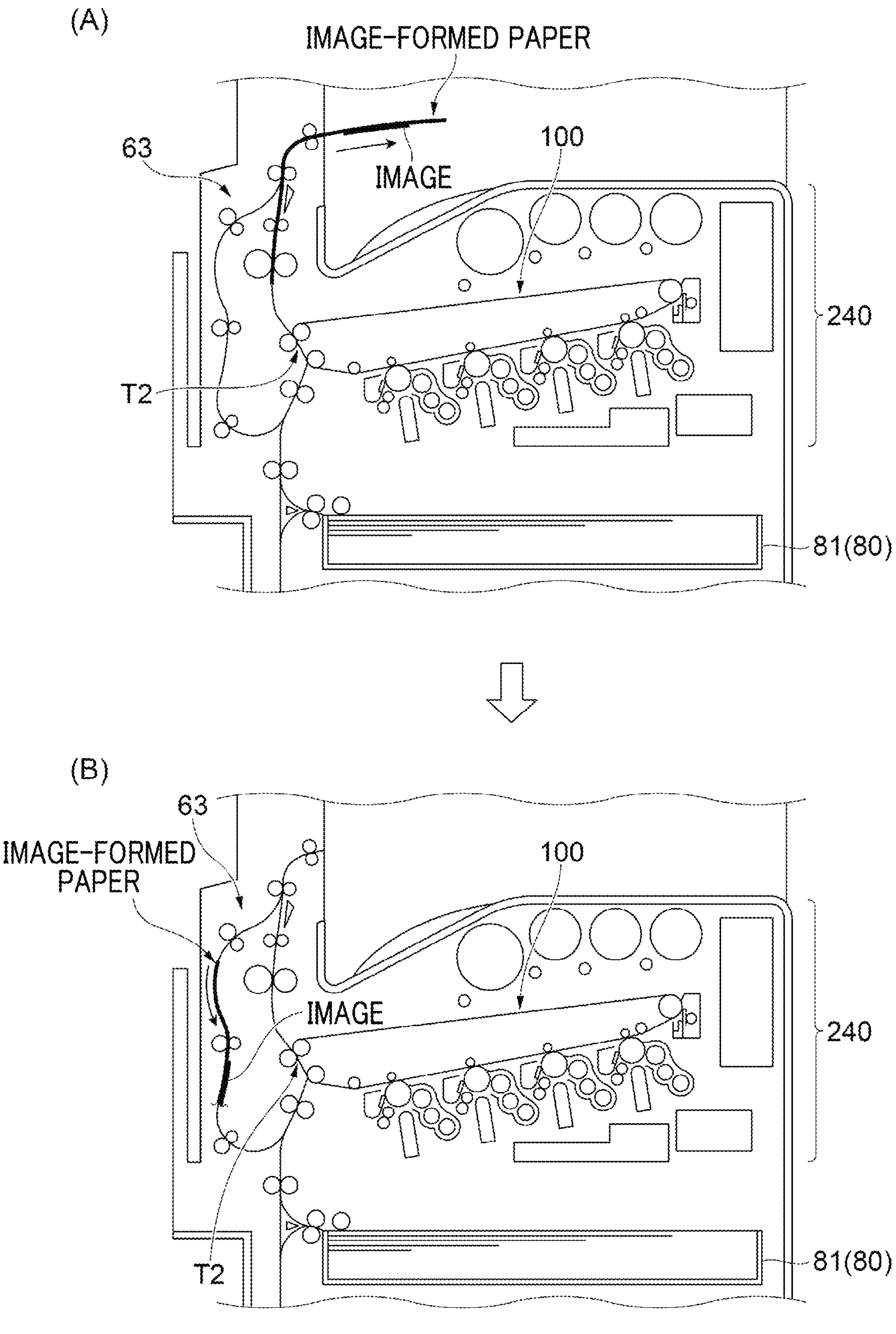
Figure 5:
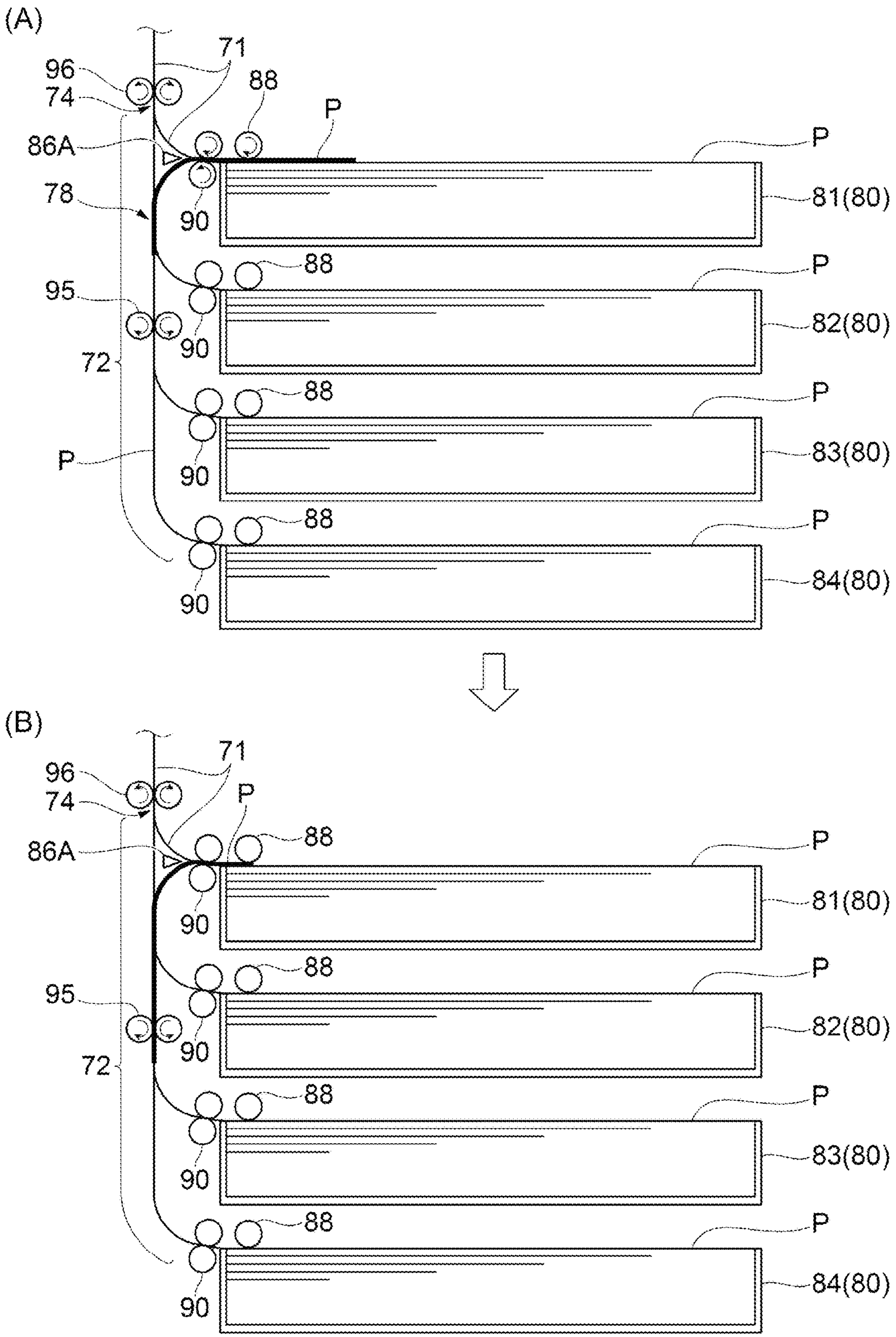
Figure 6:
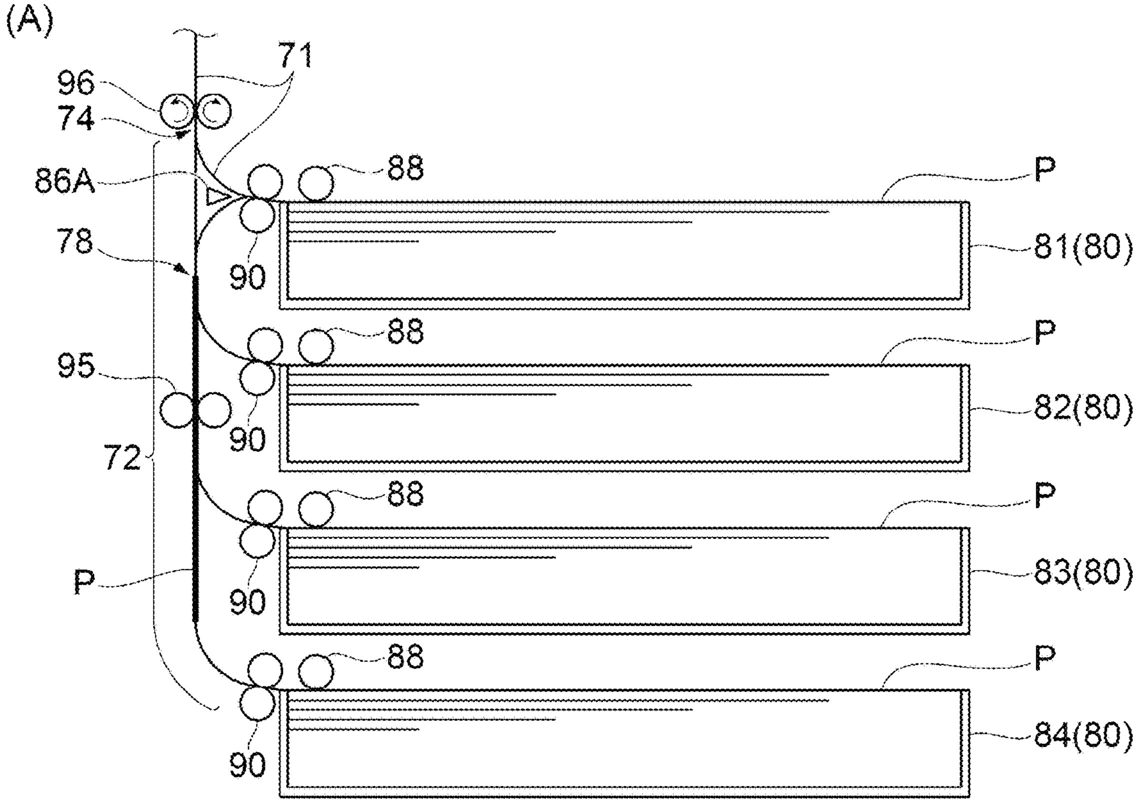
Figure 6:
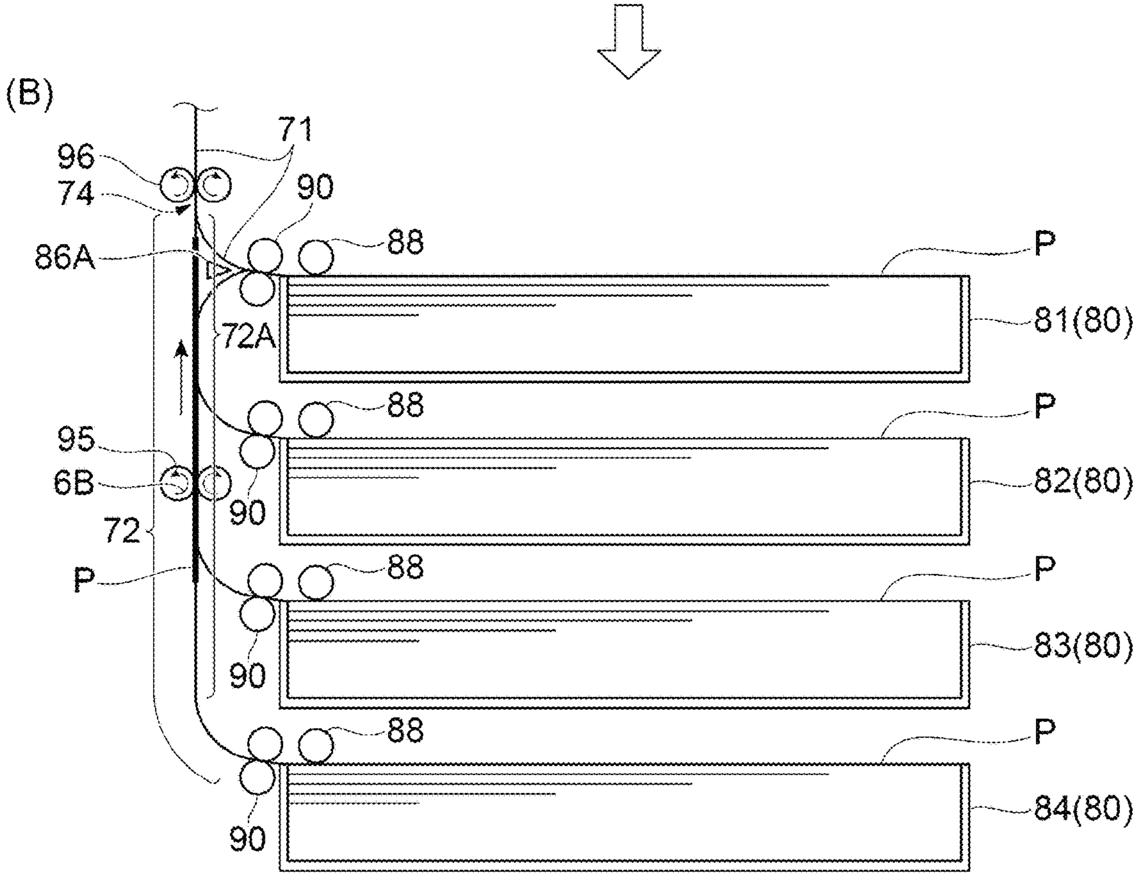
Figure 7:
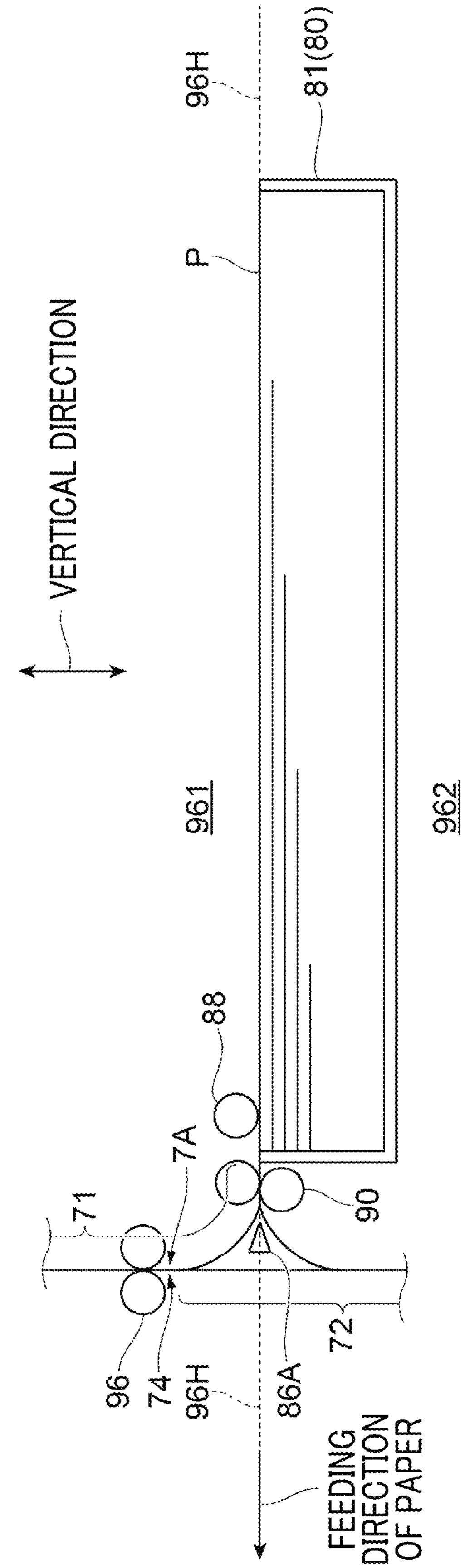
Figure 8:
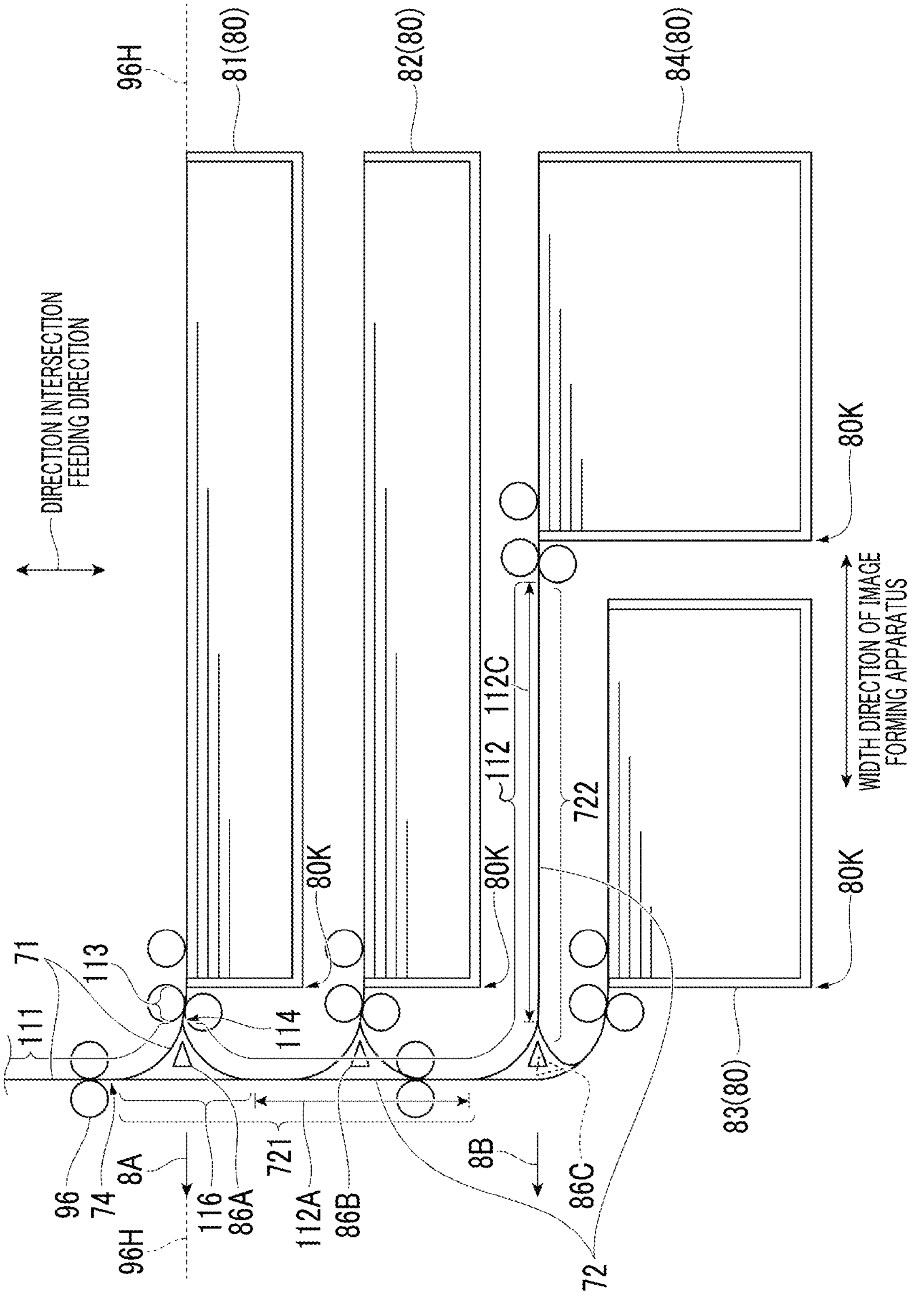
Figure 9:
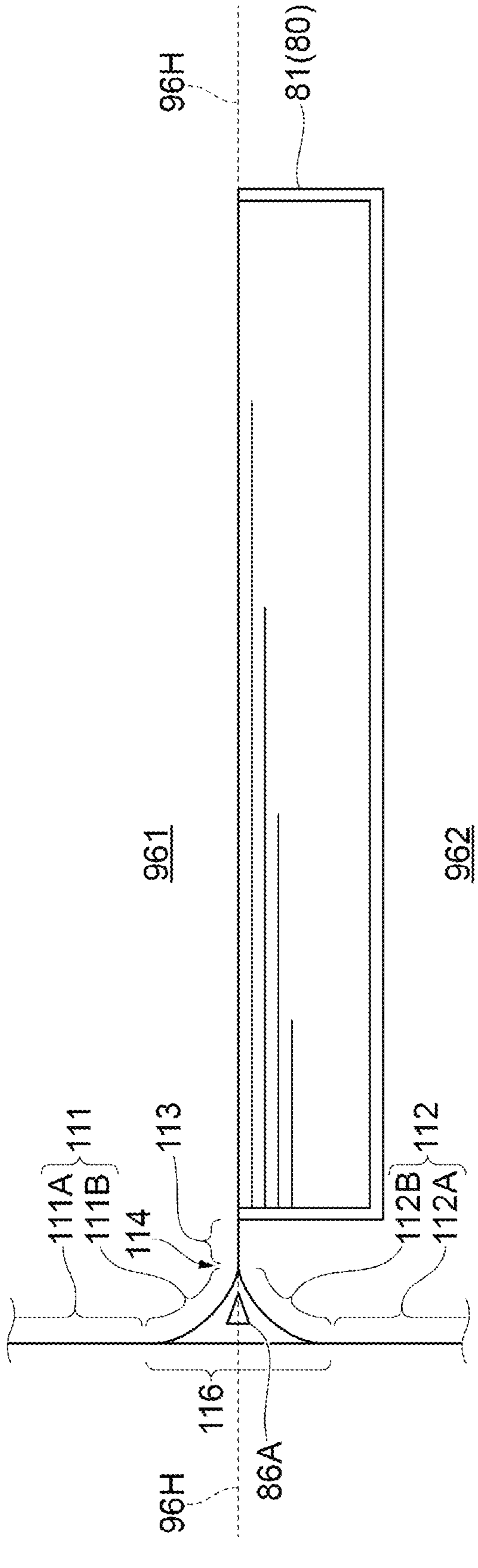
Figure 10:
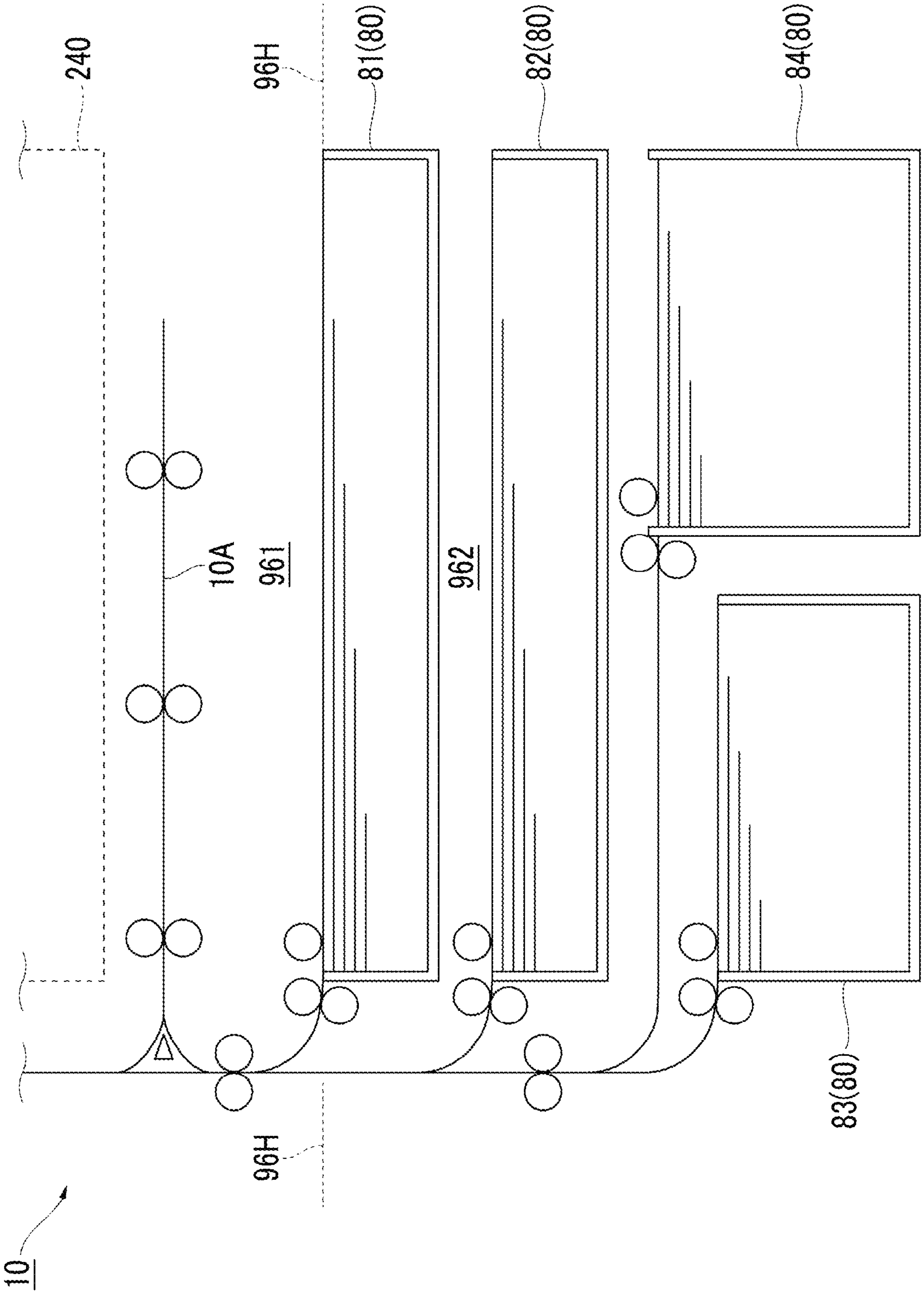

(A) and (B) of FIG. 4 are diagrams showing reversal of image-formed paper using a reversal mechanism;

(A) and (B) of FIG. 5 are diagrams showing reversal of front and back sides of the paper on an upstream side with respect to a secondary transfer section;

(A) and (B) of FIG. 6 are diagrams showing the reversal of the front and back sides of the paper on the upstream side with respect to the secondary transfer section;

FIG. 7 is an enlarged diagram of a first paper accommodation section, a medium path, and a merging path;

FIG. 8 is a diagram showing another configuration example;

FIG. 9 is an enlarged diagram of a configuration around the first paper accommodation section; and FIG. 10 is a diagram showing a comparative example.

DETAILED DESCRIPTION

Hereinafter, an exemplary embodiment of the present invention will be described with reference to the accompanying drawings.

Figure 1:
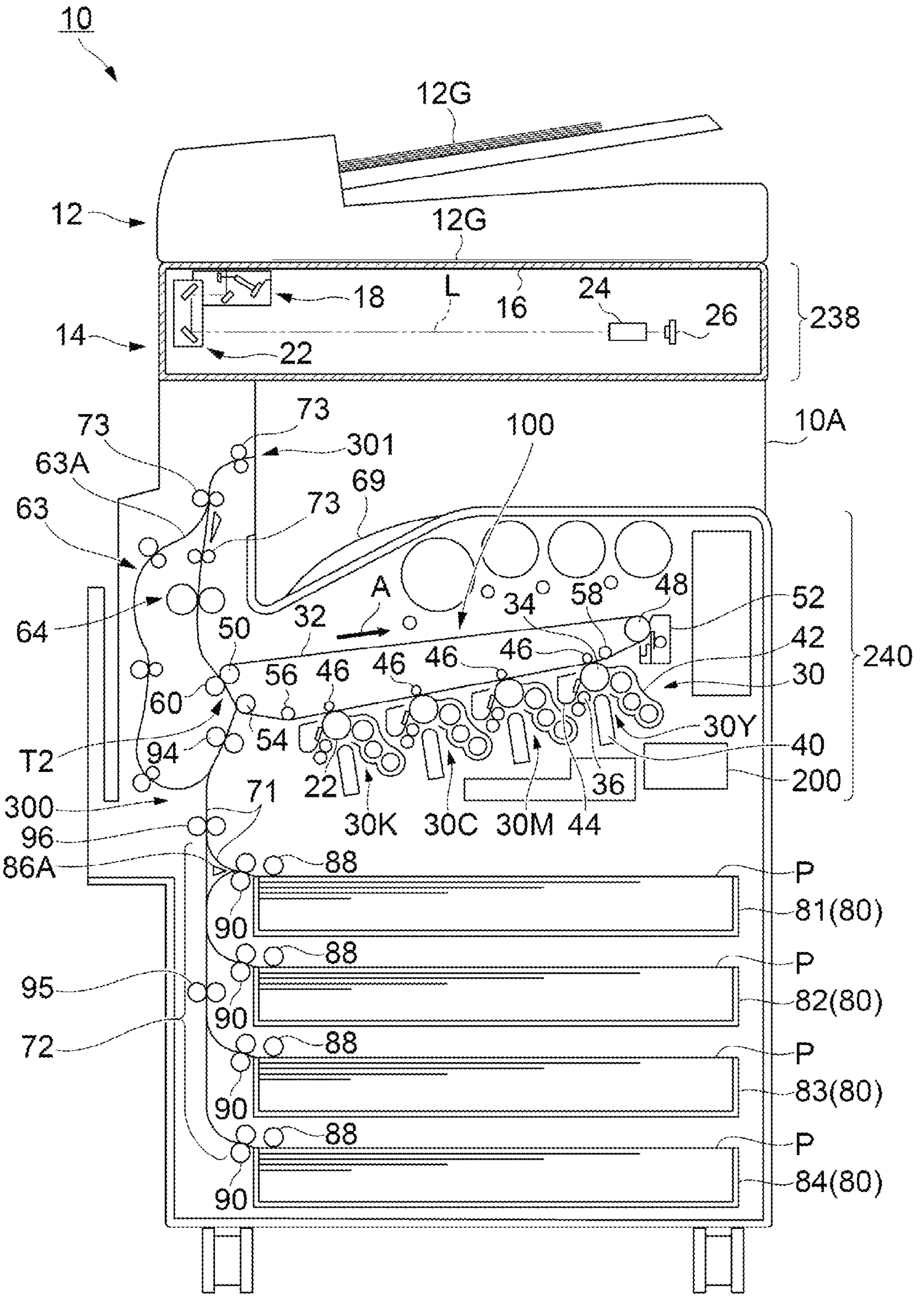
FIG. 1 is a diagram showing a configuration of an image forming apparatus.

FIG. 1 is a diagram showing a configuration of an image forming apparatus 10 according to the present exemplary embodiment.

The image forming apparatus 10 is provided with an image forming section 240 that forms an image on paper P that is an example of a recording medium.

Further, the image forming apparatus 10 is provided with a control unit 200 that controls each section of the image forming apparatus 10.

A document transport device 12 that transports a plurality of documents 12G one by one is provided on an upper portion of an apparatus body 10A of the image forming apparatus 10.

The apparatus body 10A is a housing and has a function of supporting a member constituting the image forming apparatus 10. The apparatus body 10A constitutes a part of the image forming apparatus 10.

In addition to the document transport device 12, an image reading section 238 that reads the document 12G is further provided on the upper portion of the apparatus body 10A.

The image reading section 238 reads the document 12G transported by the document transport device 12. In addition, the image reading section 238 reads the document 12G placed on platen glass 16.

The image reading section 238 is provided with a first mirror unit 18 including a light source and moving along the platen glass 16.

Further, the image reading section 238 is provided with a second mirror unit 22. The second mirror unit 22 also moves along the platen glass 16.

The second mirror unit 22 reflects reflected light that is reflected light from the document and that is reflected by the first mirror unit 18.

The reflected light reflected by the second mirror unit 22 passes through a lens 24 and heads for a light receiving element 26 such as a CCD line sensor.

The image forming section 240 is provided with a plurality of image forming units 30 that form toner images of colors different from each other.

In the present exemplary embodiment, four image forming units 30 are provided.

In the present exemplary embodiment, as the image forming units 30, an image forming unit 30Y and an image forming unit 30M are provided. Further, as the image forming unit 30, an image forming unit 30C and an image forming unit 30K are provided.

The image forming unit 30Y forms a yellow toner image. The image forming unit 30M forms a magenta toner image. The image forming unit 30C forms a cyan toner image. The image forming unit 30K forms a black toner image.

A transfer unit 100 is provided above the plurality of image forming units 30.

The transfer unit 100 is provided with an intermediate transfer belt 32. The toner image formed by each of the image forming units 30 is transferred to the intermediate transfer belt 32. The intermediate transfer belt 32 is moved in a circulating manner in a direction of an arrow A.

A drive roll 48 that drives the intermediate transfer belt 32 is provided on an inner side of the intermediate transfer belt 32. Further, a support roll 50 that supports the intermediate transfer belt 32 from the inner side is provided. Further, a tension applying roll 54 that applies tension to the intermediate transfer belt 32 is provided.

Further, an idler roll 56 and an idler roll 58, which are disposed in contact with the intermediate transfer belt 32, are provided.

Further, a belt cleaning device 52 that cleans the intermediate transfer belt 32 is provided in the transfer unit 100.

A photoreceptor drum 34 is provided in each of the image forming units 30. The photoreceptor drum 34 as an example of an image carrier holds the formed toner image.

Further, a charging member 36 that charges the photoreceptor drum 34 is provided. Further, an exposure device 40 that performs exposure on the photoreceptor drum 34 is provided. An electrostatic latent image is formed on a surface of the photoreceptor drum 34 by an exposure device 40.

Further, a development device 42 is provided. The development device 42 causes the toner to adhere to the surface of the photoreceptor drum 34. As a result, the toner adheres to the electrostatic latent image formed on the surface of the photoreceptor drum 34. As a result, the toner image is formed on the surface of the photoreceptor drum 34.

A primary transfer member 46 is provided on a side opposite to an installation side of the photoreceptor drum 34 across the intermediate transfer belt 32. The primary transfer member 46 is provided on an inner side of the intermediate transfer belt 32.

The primary transfer member 46 is used for transferring the toner image to the intermediate transfer belt 32. The toner image, which is formed on the photoreceptor drum 34, is transferred to the intermediate transfer belt 32 by the primary transfer member 46.

Further, a removal device 44 is provided in each image forming unit 30. The removal device 44 removes the toner and the like adhering to the surface of the photoreceptor drum 34 from the surface.

Further, a secondary transfer member 60 is provided on a side opposite to the installation side of the support roll 50 across the intermediate transfer belt 32. The secondary transfer member 60 is used for transferring the toner image to the paper P. In the present exemplary embodiment, the toner image on the intermediate transfer belt 32 is transferred to the paper P by the secondary transfer member 60.

Hereinafter, in the present specification, a portion in which the secondary transfer member 60 is provided is referred to as a secondary transfer section T2. In the present exemplary embodiment, the toner image on the intermediate transfer belt 32 is transferred to the paper P in the secondary transfer section T2.

Further, the image forming apparatus 10 according to the present exemplary embodiment is provided with a transport device 300 that transports the paper P.

The transport device 300 as an example of a recording medium transport device is provided with a paper accommodation section 80 that accommodates the paper P that is an example of a recording medium.

The transport device 300 transports the paper P fed out from the paper accommodation section 80 as an example of a medium accommodation section to the secondary transfer section T2.

Further, the transport device 300 transports the paper P that has passed through the secondary transfer section T2 to a paper discharge section 301. The paper P transported to the paper discharge section 301 is discharged to the outside of the apparatus body 10A.

In the present exemplary embodiment, a first paper accommodation section 81 and a second paper accommodation section 82 are provided as the paper accommodation section 80. Further, a third paper accommodation section 83 and a fourth paper accommodation section 84 are provided as the paper accommodation section 80.

Further, a feeding roll 88 that feeds out the paper P accommodated in the paper accommodation section 80 is provided. The feeding roll 88 is provided in a form corresponding to each of the first paper accommodation section 81 to the fourth paper accommodation section 84.

Further, a transport roll 90 that transports the paper P is provided on the downstream side with respect to the feeding roll 88. The transport roll 90 is also provided in a form corresponding to each of the first paper accommodation section 81 to the fourth paper accommodation section 84.

Further, an upstream transport roll 95 and a downstream transport roll 96 are provided. These transport rolls further transport the paper P transported by the transport roll 90.

Here, a transport direction of the paper P in a case in which the paper P heads for the secondary transfer section T2 is assumed. In the transport direction, the downstream transport roll 96 is located on the downstream side with respect to the upstream transport roll 95.

The downstream transport roll 96 is provided in a medium path 71. The downstream transport roll 96 transports the paper P that is located on the medium path 71, toward the secondary transfer section T2.

The upstream transport roll 95 is provided in a merging path 72. The upstream transport roll 95 transports the paper P that is located on the merging path 72, toward a side on which the downstream transport roll 96 is located.

In addition, the upstream transport roll 95 transports the paper P that is located on the merging path 72, toward a side opposite to the side on which the downstream transport roll 96 is located.

In the present exemplary embodiment, as will be described later, the merging path 72 may be used, and the front and back sides of the paper P may be reversed. In this case, the upstream transport roll 95 transports the paper P on the merging path 72 toward a side opposite to the side on which the downstream transport roll 96 is located.

In addition, a feeding roll 94 is provided on the secondary transfer section T2 side with respect to the downstream transport roll 96. The feeding roll 94 feeds out the paper P to the secondary transfer section T2.

Further, a fixing device 64 is provided on the downstream side with respect to the secondary transfer section T2 in the transport direction of the paper P.

In the present exemplary embodiment, the toner image on the intermediate transfer belt 32 is transferred to the paper P in the secondary transfer section T2.

In the present exemplary embodiment, the paper P to which the toner image is transferred heads for the fixing device 64. The fixing device 64 performs pressurization and heating the paper P to which the toner image is transferred. As a result, the toner image is fixed to the paper P.

In the transport direction of the paper P, a paper loading section 69 is provided on the downstream side of the fixing device 64. The paper P on which the toner image is fixed is loaded on the paper loading section 69.

In the present exemplary embodiment, the paper P accommodated in the paper accommodation section 80 is transported to the paper loading section 69 by the transport device 300. In the process of the transport, the image is formed on the paper P.

A plurality of transport rolls 73 that transport the paper P are provided on the downstream side with respect to the fixing device 64. In the present exemplary embodiment, the paper P on which the toner image is fixed is transported to the paper discharge section 301 by the transport roll 73.

Further, in the present exemplary embodiment, a reversal mechanism 63 that reverses the front and back sides of the paper P is provided.

In the present exemplary embodiment, in a case in which the image is formed on both sides of the paper P, the reversing of the front and back sides of the paper P, which has passed through the secondary transfer section T2, is performed by the reversal mechanism 63.

In a case in which the front and back sides of the paper P are reversed by the reversal mechanism 63, the paper P, which has passed through the secondary transfer section T2, is fed out to a reversal path 63A.

Then, the paper P is supplied to the secondary transfer section T2 again through the reversal path 63A. As a result, the toner image is also formed on the back side of the paper P.

Figure 2:
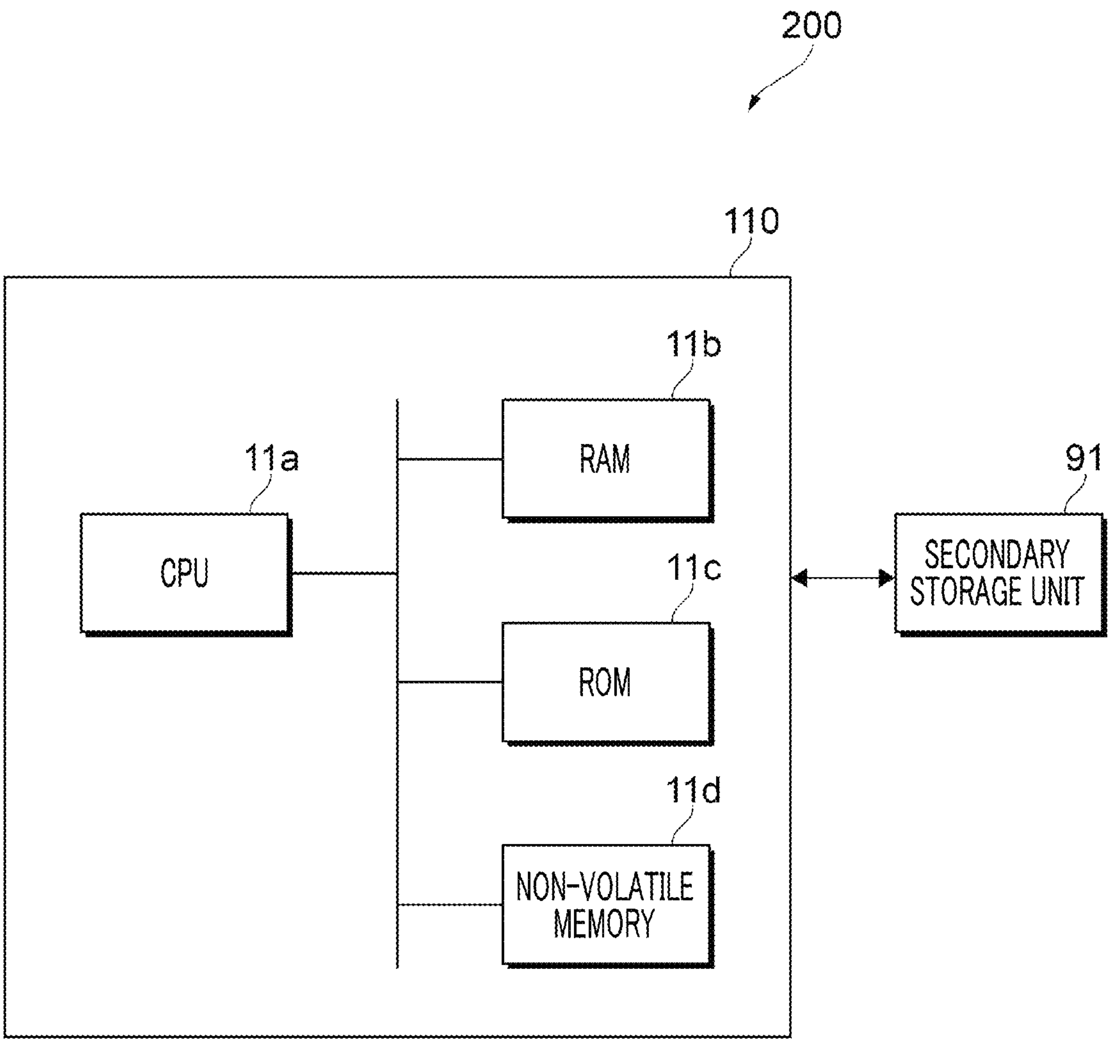
FIG. 2 is a diagram showing a hardware configuration example of a control unit.

FIG. 2 is a diagram showing a hardware configuration example of the control unit 200. The control unit 200 is implemented by a computer.

The control unit 200 includes an arithmetic processing unit 110. The arithmetic processing unit 110 executes digital arithmetic processing according to a program. In addition, the control unit 200 includes a secondary storage unit 91 that stores information.

The secondary storage unit 91 is implemented by an existing information storage device. Examples of the existing information storage device include a hard disk drive (HDD), a semiconductor memory, and a magnetic tape.

The arithmetic processing unit 110 is provided with a CPU 11*a* as an example of a processor.

In addition, the arithmetic processing unit 110 is provided with a RAM 11*b* that is used as a work memory or the like of the CPU 11*a*. Further, the arithmetic processing unit 110 is provided with a ROM 11*c* in which a program and the like executed by the CPU 11*a* are stored.

In addition, the arithmetic processing unit 110 is provided with a non-volatile memory 11*d* that can hold data even in a case in which power supply is interrupted.

The non-volatile memory 11*d* is configured by, for example, an SRAM or a flash memory that is backed up by a battery. Various types of information such as the program executed by the CPU 11*a* are stored in the secondary storage unit 91.

In the present exemplary embodiment, the CPU 11*a* reads the program stored in the ROM 11*c* or the secondary storage unit 91. As a result, various types of processing, which are performed by the image forming apparatus 10, are executed.

The program, which is executed by the CPU 11*a*, may be provided to the image forming apparatus 10 via a recording medium.

Examples of the storage medium include a magnetic recording medium such as a magnetic tape or a magnetic disk. Examples of the storage medium also include an optical recording medium such as an optical disc. Examples of the storage medium also include an optical magnetic recording medium. Examples of the storage medium also include a semiconductor memory.

The program executed by the CPU 11*a* may be provided to the image forming apparatus 10 by using communication means such as the Internet.

In the present exemplary embodiment, each processing is executed by the computer. In addition, the computer may execute these types of processing by the processor, the program, or a combination thereof. The computer may be a general-purpose computer, a computer for a specific use, a system such as a workstation, or other hardware elements that can execute the program.

The processor may be configured by one or a plurality of pieces of hardware, and the types of hardware are not limited. For example, the processor can be configured by a central processing unit (CPU), a micro processing unit (MPU), a programmable logic device such as a field programmable gate array (FPGA), a dedicated circuit for executing specific processing such as an application-specific integrated circuit (ASIC), or hardware such as a graphic processing unit (GPU) or a neural processing unit (NPU). In addition, the processor has each unit or each means that executes various types of processing in the present exemplary embodiment. In addition, the types of hardware may be a combination of different types of hardware. In a case in which a plurality of pieces of hardware are configured to execute one or a plurality of pieces of processing of a certain processor, the plurality of pieces of hardware may be present in devices physically separated from each other, or may be present in the same device. In addition, in any of the exemplary embodiments, the order of each processing by the processor is not limited to the above-described order and may be changed as appropriate. The hardware is configured by an electric circuit (circuitry) in which circuit elements, such as semiconductor elements, are combined.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the present exemplary embodiment may be implemented by hardware, software, firmware, microcode, or a combination thereof. Software, firmware, and microcode are configured by the program. In addition, the program may be, for example, a program module group, and each function thereof may be implemented by a processor configured to execute each function. The program may be a program code or a plurality of code segments stored in one or a plurality of non-transitory computer-readable media (for example, storage media or other storages). The program may be stored in a plurality of non-transitory computer-readable media present in physically separated devices.

The program code or the code segment may represent any combination of a procedure, a function, a sub-program, a routine, a sub-routine, a module, a software package, a class, or an instruction, a data structure, or a program statement. The program code or the code segment may be connected to another code segment or a hardware circuit by transmitting and receiving information, data, an argument, a parameter, or a content of a memory.

A series of flows of processing of forming the image on the paper P will be described.

In the present exemplary embodiment, the processing of forming the image on the paper P is performed under the control of the CPU 11*a* as an example of a processor.

In a case in which an image is formed on the paper P, first, light is emitted from the exposure device 40 shown in FIG. 1. The light is emitted from the exposure device 40 in each of the image forming units 30. The surface of the photoreceptor drum 34 on which the charging is performed by the charging member 36 is irradiated with the emitted light.

As a result, the photoreceptor drum 34 is exposed. As a result, the electrostatic latent image is formed on the surface of the photoreceptor drum 34.

Next, the development device 42 supplies the toner to the electrostatic latent image. Accordingly, the development is performed, and the toner image is formed on the surface of the photoreceptor drum 34.

The toner image, which is formed on the surface of the photoreceptor drum 34, is transferred to the intermediate transfer belt 32 by the primary transfer member 46. The toner image, which is formed in each of the image forming units 30, is transferred to the intermediate transfer belt 32 by the primary transfer member 46.

Accordingly, the toner image in a state in which the toner images of each color are superimposed on each other is formed on the surface of the intermediate transfer belt 32.

In the present exemplary embodiment, the toner image is transferred to the paper P transported to the secondary transfer section T2.

In the present exemplary embodiment, the transport device 300 transports the paper P to the secondary transfer section T2. In the secondary transfer section T2, the toner image on the intermediate transfer belt 32 is transferred to the transported paper P.

The paper P to which the toner image is transferred is transported to the fixing device 64. As a result, the toner image is fixed to the paper P.

Thereafter, the paper P is transported to the paper discharge section 301 by the transport device 300. Then, the paper P moves to the outside of the apparatus body 10A through the paper discharge section 301. Then, the paper P is loaded on the paper loading section 69.

In a case in which the image is formed on both sides of the paper P, the front and back sides of the paper P is reversed by the reversal mechanism 63.

Then, the toner image, which is newly formed on the intermediate transfer belt 32, is transferred to the paper P of which the front and back sides are reversed. Then, the paper P passes through the fixing device 64 again. Then, the paper P moves to the paper loading section 69 through the paper discharge section 301.

Figure 3:
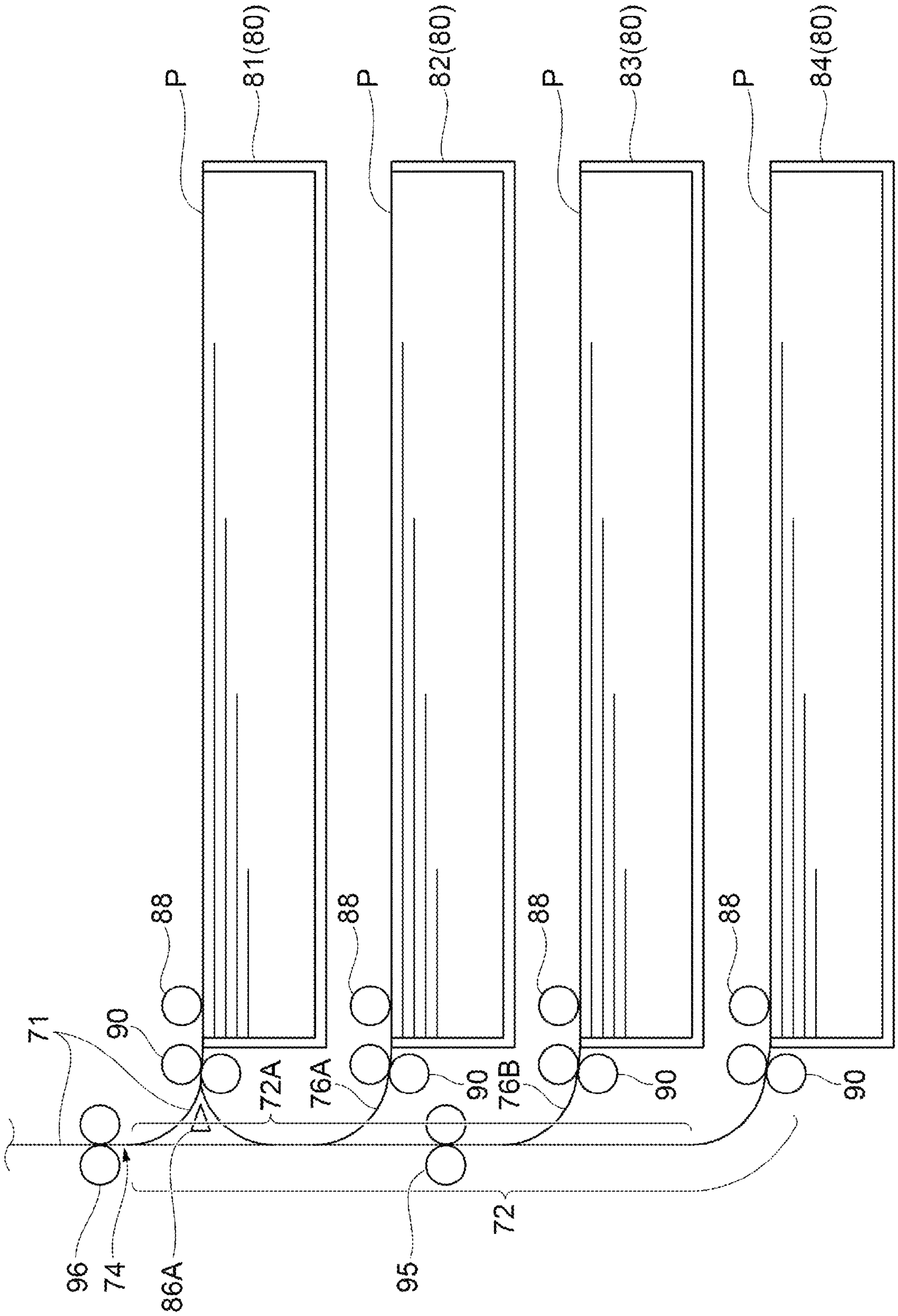
FIG. 3 is a diagram showing a configuration below an image forming section in an enlarged manner.

FIG. 3 is a diagram showing a configuration below the image forming section 240 in an enlarged manner.

The first paper accommodation section 81 to the fourth paper accommodation section 84 are provided below the image forming section 240 shown in FIG. 1.

In addition, in the present exemplary embodiment, the medium path 71, which is a path through which the paper P fed out from the first paper accommodation section 81 passes, is provided.

The paper P fed out from the first paper accommodation section 81 passes through the medium path 71.

A start point of the medium path 71 is the first paper accommodation section 81. The medium path 71 extends toward the secondary transfer section T2 shown in FIG. 1 via a merging section 74.

Further, in the present exemplary embodiment, the merging path 72 that merges with the medium path 71 is provided. The merging path 72 merges with the medium path 71 at the merging section 74.

The merging path 72 is provided in a form of extending upward from the fourth paper accommodation section 84 as a start point.

After the merging path 72 extends upward from the lower side, the merging path 72 merges with the medium path 71 at the merging section 74. The merging path 72 has a linear portion 72A that extends in an up-down direction and is formed in a straight line shape.

Further, in the present exemplary embodiment, a first connection path 76A connecting the merging path 72 and the second paper accommodation section 82 is provided. In addition, a second connection path 76B connecting the merging path 72 and the third paper accommodation section 83 is provided.

The paper P from the fourth paper accommodation section 84 passes through the merging path 72 and the medium path 71 and heads for the secondary transfer section T2 shown in FIG. 1.

The paper P from the second paper accommodation section 82 enters the merging path 72 through the first connection path 76A. The paper P passes through the merging path 72 and the medium path 71 and heads for the secondary transfer section T2.

The paper P from the third paper accommodation section 83 enters the merging path 72 through the second connection path 76B. The paper P passes through the merging path 72 and the medium path 71 and heads for the secondary transfer section T2.

Further, in the present exemplary embodiment, a switching member 86A that switches a transport destination of the paper P fed out from the first paper accommodation section 81 is provided.

The switching member 86A is rotatably provided.

In the present exemplary embodiment, the transport destination of the paper P is set to any of the medium path 71 or the merging path 72 by rotating the switching member 86A.

In the present exemplary embodiment, the front and back sides of the paper P can be reversed even on the upstream side with respect to the secondary transfer section T2 shown in FIG. 1.

Hereinafter, the reversal of the front and back sides of the paper P on the upstream side with respect to the secondary transfer section T2 will be described.

In the present exemplary embodiment, the front and back sides of the paper P are reversed in a case in which a predetermined condition is satisfied, such as a case in which an instruction is given from a user.

The front and back sides of the paper P are reversed on the upstream side with respect to the secondary transfer section T2. Then, the paper P of which the front and back sides are reversed is transported to the secondary transfer section T2.

The paper accommodation section 80 may accommodate the paper P on which the image is already formed on one side. Hereinafter, in the present specification, the paper P on which the image is already formed on one side is referred to as "image-formed paper P".

In this case, a side of the image-formed paper P on which the image is already formed may face the intermediate transfer belt 32 side shown in FIG. 1. There is a possibility that the side on which the image is already formed faces the intermediate transfer belt 32 side in a case in which the image-formed paper P reaches the secondary transfer section T2.

A case is assumed in which the image-formed paper P on which the image is already formed is accommodated in the paper accommodation section 80 in a state in which the image-formed paper P faces upward. In this case, in a case in which the image-formed paper P reaches the secondary transfer section T2, the side on which the image is already formed faces the intermediate transfer belt 32 side.

In order to avoid such a situation, in the present exemplary embodiment, the front and back sides of the paper P are reversed on the upstream side with respect to the secondary transfer section T2.

Then, the paper P of which the front and back sides are reversed is transported to the secondary transfer section T2. In this case, a side of the paper P on which the image is not yet formed faces the intermediate transfer belt 32 side.

Then, the toner image on the intermediate transfer belt 32 is transferred to the side on which the image is not yet formed.

Here, the front and back sides of the image-formed paper P can be reversed even by using the reversal mechanism 63. In this case, a path length of the path through which the image-formed paper P passes is increased. In this case, the reversal of the front and back sides of the paper P tends to take time.

(A) and (B) of FIG. 4 are diagrams showing the reversal of the image-formed paper P using the reversal mechanism 63.

In a case in which the reversal mechanism 63 is used, as shown in (A) of FIG. 4, it is necessary to temporarily feed the image-formed paper P to the downstream side with respect to the secondary transfer section T2.

In this case, the path length of the path through which the image-formed paper P passes is increased, and the reversal of the front and back sides of the image-formed paper P tends to take time.

On the other hand, in the present exemplary embodiment, the reversal of the image-formed paper P is performed on the upstream side with respect to the secondary transfer section T2. In this case, the path length of the path through which the image-formed paper P passes is smaller. In this case, the time required for the reversal of the front and back sides of the paper P is shortened.

FIGS. 5 and 6 are views showing the reversal of the front and back sides of the paper P on the upstream side with respect to the secondary transfer section T2.

In the present exemplary embodiment, the front and back sides of the paper P accommodated in the first paper accommodation section 81 can be reversed. This reversal processing is performed by the CPU 11*a* as an example of a processor.

In a case of performing the reversal of the front and back sides of the paper P accommodated in the first paper accommodation section 81, the CPU 11*a* first performs the processing shown in (A) of FIG. 5. The CPU 11*a* first causes the paper P to head for the merging path 72 as shown in (A) of FIG. 5.

The CPU 11*a* causes the paper P, which is fed out from the first paper accommodation section 81 to the medium path 71, to head for the merging path 72.

In a case in which the front and back sides of the paper P are reversed, the CPU 11*a* sets an orientation of the switching member 86A to an orientation in which the paper P heads for the merging path 72. Accordingly, the paper P, which is fed out from the first paper accommodation section 81 to the medium path 71, heads for the merging path 72.

Further, as shown in (B) of FIG. 5, the CPU 11*a* further transports the paper *P* heading for the merging path 72, along the merging path 72. The CPU 11*a* further transports the paper P heading for the merging path 72, to the upstream side in the merging path 72.

The CPU 11*a* rotates the upstream transport roll 95 in a reverse direction, so that the paper P is transported to the upstream side in the merging path 72. Accordingly, the paper P on the merging path 72 is transported to the upstream side in the merging path 72.

In the present specification, a rotation direction of the upstream transport roll 95 in a case in which the paper P heads for the merging section 74 is referred to as a "forward direction". In addition, a rotation direction in the reverse direction of the forward direction is referred to as the "reverse direction".

Next, as shown in (A) of FIG. 6, the CPU 11*a* temporarily stops the transport of the paper P.

The CPU 11*a* temporarily stops the rotation of the upstream transport roll 95. In this state, a rear end portion 78 of the paper P in the transport direction passes through the switching member 86A.

Next, the CPU 11*a* rotates the upstream transport roll 95 in the forward direction as indicated by an arrow 6B in (B) of FIG. 6. The CPU 11*a* reverses the rotation direction of the upstream transport roll 95 so that the upstream transport roll 95 rotates in the forward direction.

As a result, the transport direction of the paper P is reversed. As a result, the paper P on the merging path 72 is transported toward the medium path 71.

The paper P on the merging path 72 passes through the linear portion 72A of the merging path 72 and heads for the merging section 74 between the merging path 72 and the medium path 71.

Then, the paper P passes through the merging section 74 and the medium path 71 and heads for the secondary transfer section T2.

The front and back sides of the paper P accommodated in the first paper accommodation section 81 are reversed by the above-described processing.

The merging path 72 is originally a path for allowing the passage of the paper P fed out from the paper accommodation section 80 that is another paper accommodation section different from the first paper accommodation section 81.

Specifically, the merging path 72 is originally a path for allowing the passage of the paper P fed out from the paper accommodation sections 80 that is another paper accommodation section, such as the fourth paper accommodation section 84.

In a case in which the paper P is fed out from the fourth paper accommodation section 84, the paper P passes through the merging path 72 and heads for the medium path 71. Further, the paper P from the second paper accommodation section 82 or the third paper accommodation section 83 also passes through the merging path 72 and heads for the medium path 71.

In the present exemplary embodiment, a path through which the paper P passes from the paper accommodation section 80 that is another paper accommodation section different from the paper accommodation section 80 in which the paper P that is a reversal target is accommodated is provided.

In the present exemplary embodiment, the front and back sides of the paper P, from the paper accommodation section 80 in which the paper P that is the reversal target is accommodated, are reversed by using the path.

In the present exemplary embodiment, the paper accommodation section 80 in which the paper P that is the reversal target is accommodated is the first paper accommodation section 81.

In the present exemplary embodiment, the merging path 72 through which the paper P from the fourth paper accommodation section 84 different from the first paper accommodation section 81 passes is used. The front and back sides of the paper P are reversed by using the merging path 72.

In the present exemplary embodiment, the front and back sides of the paper P fed out from the first paper accommodation section 81 are reversed by using a path for the paper P fed out from the fourth paper accommodation section 84.

The CPU 11*a* transports the paper P from the first paper accommodation section 81 to the merging path 72 in a case in which a predetermined specific condition is satisfied.

Examples of the predetermined condition include a case in which an instruction is given from the user.

In addition, as the predetermined condition, a case in which the image-formed paper P is accommodated in the first paper accommodation section 81 and the image formed on the image-formed paper P faces the up direction is an example.

The detection of whether or not the image-formed paper P is accommodated in the first paper accommodation section 81 is performed by using a sensor (not shown). In addition, the detection of whether or not the image formed on the image-formed paper P faces the up direction is also performed by using a sensor (not shown).

Alternatively, the detection of whether or not the image-formed paper P is accommodated in the first paper accommodation section 81 is performed based on information input by the user. Further, the detection of whether or not the image formed on the image-formed paper P faces the up direction is also performed based on information input by the user.

On the other hand, in a case in which the predetermined specific condition is not satisfied, the CPU 11*a* prevents the paper P from being transported to the merging path 72. The CPU 11*a* prevents the paper P fed out from the first paper accommodation section 81 to the medium path 71 from heading for the merging path 72.

In this case, the CPU 11*a* sets the orientation of the switching member 86A to the orientation in which the paper P does not head for the merging path 72.

In this case, the paper P fed out from the first paper accommodation section 81 to the medium path 71 is transported to the downstream side through the medium path 71 without any change.

In addition, the CPU 11*a* considers a state of the merging path 72 shown in FIG. 1 in a case in which the front and back sides of the paper P are reversed.

The CPU 11*a* transport the paper P from the first paper accommodation section 81 to the merging path 72 in a case in which the paper P is not located on the merging path 72.

Specifically, the CPU 11*a* determines whether the paper P from the second paper accommodation section 82 to the fourth paper accommodation section 84 is located on the merging path 72. Then, the CPU 11*a* transport the paper P from the first paper accommodation section 81 to the merging path 72 in a case in which the paper P is not located on the merging path 72.

In addition, the CPU 11*a* prevents the paper P from being fed out in a case in which the paper P is transported from the first paper accommodation section 81 to the merging path 72.

More specifically, in this case, the CPU 11*a* prevents the paper P from being fed out from the fourth paper accommodation section 84 to the merging path 72.

Similarly, in this case, the CPU 11*a* prevents the paper P from being fed out from the second paper accommodation section 82 to the merging path 72. In addition, the CPU 11*a* prevents the paper P from being fed out from the third paper accommodation section 83 to the merging path 72.

A state is assumed in which the paper P is not located on the merging path 72. Specifically, a state is assumed in which the paper P from the second paper accommodation section 82 to the fourth paper accommodation section 84 is not located on the merging path 72.

In this case, a maximum feeding amount in a case in which the paper P is fed out from the first paper accommodation section 81 to the merging path 72 is increased. The maximum feeding amount is larger than a case in which the paper P from the second paper accommodation section 82 to the fourth paper accommodation section 84 is located on the merging path 72.

In this case, the front and back sides of longer paper P can be reversed.

FIG. 7 is an enlarged diagram of the first paper accommodation section 81, the medium path 71, and the merging path 72.

Here, a virtual plane 96H passing through the paper P fed out from the first paper accommodation section 81 is assumed. Specifically, the virtual plane 96H passing through the paper P in a case in which the paper P is fed out from the first paper accommodation section 81 is assumed. In other words, the virtual plane 96H passing through the topmost paper P among sheets of the paper P accommodated in the first paper accommodation section 81 is assumed.

The plane 96H extends along a feeding direction of the paper P in a case in which the paper P is fed out from the first paper accommodation section 81.

Further, two regions facing each other with the plane 96H interposed between the two regions are assumed.

Specifically, a first region 961 and a second region 962 are assumed.

The first region 961 is a region located on the upper side with respect to the plane 96H. The second region 962 is a region located below the plane 96H.

The medium path 71 extends from the first paper accommodation section 81 as a start point toward a left direction in the drawing. In other words, the medium path 71 extends from the first paper accommodation section 81 as a start point toward the downstream side in the feeding direction of the paper P.

The medium path 71 first passes through the plane 96H and extends to the downstream side in the feeding direction. Thereafter, the medium path 71 changes a heading direction and is directed toward the first region 961 side.

On the other hand, the merging path 72 is located largely on the second region 962 side of the two regions.

The merging path 72 extends from the second region 962 side toward a portion indicated by reference numeral 7A located on the first region 961 side in the medium path 71.

The merging path 72 is connected to the portion indicated by reference numeral 7A in the medium path 71.

In the present exemplary embodiment, a portion of the medium path 71 at which the merging path 72 is connected is the merging section 74. The merging section 74 is located on the first region 961 side.

The plane 96H extends in a direction intersecting a vertical direction. More specifically, in the present exemplary embodiment, the plane 96H extends in a horizontal direction.

The medium path 71 extends from the first paper accommodation section 81 as a start point through the plane 96H toward the downstream side in the transport direction of the paper P.

Thereafter, the medium path 71 extends toward the first region 961 side located on the upper side of the two regions facing each other with the plane 96H interposed between the two regions.

The merging path 72 extends from the second region 962 side on the lower side with respect to the plane 96H toward the upper side, and merges with the medium path 71.

In the present exemplary embodiment, as shown in FIG. 1, a plurality of paper accommodation sections 80 that accommodate the paper P are provided. In the present exemplary embodiment, the four paper accommodation sections 80 of the first paper accommodation section 81 to the fourth paper accommodation section 84 are provided.

The plurality of paper accommodation sections 80 are arranged in the up-down direction.

The merging path 72 is disposed beside the plurality of paper accommodation sections 80. Further, the merging path 72 is provided in a form along the up-down direction.

In addition, in a case in which the front and back sides of the paper P are reversed, the paper P may be caused to pass through the merging path 72 and head for the second paper accommodation section 82. In addition, in a case in which the front and back sides of the paper P are reversed, the paper P may be caused to pass through the merging path 72 and head for the third paper accommodation section 83.

In addition, in a case in which the front and back sides of the paper P are reversed, it is most preferable that the paper P is caused to pass through the merging path 72 and head for the fourth paper accommodation section 84.

The fourth paper accommodation section 84 is the paper accommodation section 80 located at the lowest position. In other words, the fourth paper accommodation section 84 is the paper accommodation section 80 located at the farthest position from the first paper accommodation section 81.

In this case, in a case in which the paper P is caused to head for the fourth paper accommodation section 84, the maximum feeding amount in a case in which the paper P is fed to the merging path 72 is increased. In this case, the longer paper P can be reversed.

FIG. 8 is a diagram showing another configuration example.

In this configuration example shown in FIG. 8, the merging path 72 from the fourth paper accommodation section 84 toward the merging section 74 is provided.

In this configuration example, the merging path 72 includes an up-down direction portion 721, which is a portion extending along the up-down direction, and further includes an intersection direction portion 722.

The intersection direction portion 722 is connected to the up-down direction portion 721. The intersection direction portion 722 is disposed in a relationship intersecting the up-down direction portion 721.

The intersection direction portion 722 is disposed in a relationship intersecting an extension direction of the up-down direction portion 721. In the present exemplary embodiment, the intersection direction portion 722 is provided in a form extending in a direction intersecting the vertical direction. The intersection direction portion 722 is provided in a form extending in the horizontal direction.

Here, a transport direction of the paper P fed out from the fourth paper accommodation section 84 is assumed. In the transport direction, the intersection direction portion 722 is located on the upstream side with respect to the up-down direction portion 721.

In addition, in this configuration example shown in FIG. 8, a width direction of the image forming apparatus 10 is assumed. The width direction of the image forming apparatus 10 coincides with a right-left direction in FIG. 8.

In the width direction, the fourth paper accommodation section 84 is provided on a side opposite to a side on which the up-down direction portion 721 is provided.

In this configuration example shown in FIG. 8, the fourth paper accommodation section 84 is provided on a side opposite to the side on which the up-down direction portion 721 is provided, across the third paper accommodation section 83.

In this case, a path length of the merging path 72 is increased. The path length of the merging path 72 is longer than a path length in a configuration in which the fourth paper accommodation section 84 is provided at the installation portion of the third paper accommodation section 83.

In this case, the longer paper P can be fed to the merging path 72. In this case, the front and back sides of longer paper P can be reversed.

Here, a feeding direction in a case in which the paper P is fed out from the first paper accommodation section 81 is assumed.

The feeding direction in a case in which the paper P is fed out from the first paper accommodation section 81 is a direction indicated by an arrow 8A in the drawing.

In addition, a feeding direction in a case in which the paper P is fed out from the fourth paper accommodation section 84 is assumed. The feeding direction in a case in which the paper P is fed out from the fourth paper accommodation section 84 is a direction indicated by an arrow 8B in the drawing.

In the present exemplary embodiment, the feeding direction in a case in which the paper P is fed out from the first paper accommodation section 81 and the feeding direction in a case in which the paper P is fed out from the fourth paper accommodation section 84 are aligned with each other.

In the present exemplary embodiment, the feeding direction of the paper P is the left direction in the drawing in any of the paper accommodation sections 80.

The paper P from the first paper accommodation section 81 and the paper P from the fourth paper accommodation section 84 are both fed out in the left direction in the drawing, which is a common direction.

In the same manner, the paper P from the second paper accommodation section 82 and the paper P from the third paper accommodation section 83 are also fed out in the left direction in the drawing.

Here, an intersection direction, which is a direction intersecting the feeding direction, is assumed.

In the intersection direction, the position of the first paper accommodation section 81 and the position of the fourth paper accommodation section 84 are different from each other.

More specifically, the position of the first paper accommodation section 81 and the position of the fourth paper accommodation section 84 are different from each other in a direction orthogonal to the feeding direction.

In the present exemplary embodiment, the position of the first paper accommodation section 81 and the position of the fourth paper accommodation section 84 are different from each other in the vertical direction.

In addition, in the present exemplary embodiment, the position of the first paper accommodation section 81 and the position of the second paper accommodation section 82 are different from each other in the direction orthogonal to the feeding direction.

In addition, in the present exemplary embodiment, the position of the first paper accommodation section 81 and the position of the third paper accommodation section 83 are different from each other in the direction orthogonal to the feeding direction.

Each of the first paper accommodation section 81 to the fourth paper accommodation section 84 has a downstream end portion 80K.

The downstream end portion 80K refers to an end portion, among end portions of the paper accommodation section 80, which is located on the most downstream side in the feeding direction of the paper P.

Here, the positions of the downstream end portions 80K in the feeding direction are compared.

In the feeding direction, the downstream end portion 80K of the fourth paper accommodation section 84 is compared with the downstream end portion 80K of the first paper accommodation section 81.

In the present exemplary embodiment, the downstream end portion 80K of the fourth paper accommodation section 84 is located on the upstream side with respect to the downstream end portion 80K of the first paper accommodation section 81.

In this case, the intersection direction portion 722 is longer than in a case in which the positions in the feeding direction are the same.

Here, a case is assumed in which the downstream end portion 80K of the fourth paper accommodation section 84 is located on the left side of the position shown in the drawing. Further, a case is assumed in which the downstream end portion 80K of the fourth paper accommodation section 84 is located directly below the downstream end portion 80K of the first paper accommodation section 81.

In the present exemplary embodiment, the intersection direction portion 722 is longer than in a configuration in a case in which the two assumptions are made. In this case, the path length of the merging path 72 is larger. In this case, the longer paper P can be reversed.

In the configuration example shown in FIG. 8, a second switching member 86B corresponding to the second paper accommodation section 82 is further provided. Accordingly, in this configuration example, the front and back sides of the paper P accommodated in the second paper accommodation section 82 can be reversed.

In a case in which the front and back sides of the paper are reversed, the paper P fed out from the second paper accommodation section 82 is caused to head for the fourth paper accommodation section 84.

Thereafter, the transport direction of the paper P heading for the fourth paper accommodation section 84 is reversed. Thereafter, the paper P passes through the merging section 74 and heads for the secondary transfer section T2 shown in FIG. 1.

FIG. 9 is an enlarged diagram of a configuration around the first paper accommodation section 81. In FIG. 9, the transport roll is not shown.

In the present exemplary embodiment, it can be said that a first medium path 111 through which the paper P fed out from the first paper accommodation section 81 passes is provided. In addition, it can be said that a second medium path 112 through which the paper P fed out from the first paper accommodation section 81 passes is provided.

The first medium path 111 is located on the first region 961 side of two regions facing each other with the plane 96H interposed between the two regions. The second medium path 112 is located on the second region 962 side of the two regions.

Further, in the present exemplary embodiment, a common path 113 is provided.

The common path 113 is provided in a form extending along the plane 96H.

The paper P heading for the first medium path 111 and the second medium path 112 from the first paper accommodation section 81 passes through the common path 113.

In the present exemplary embodiment, the branch section 114 is provided at an end portion on the downstream side in the transport direction of the paper P, in the common path 113.

At the branch section 114, a path through which the paper P passes branches, and the path is divided into the first medium path 111 and the second medium path 112.

The first medium path 111 and the second medium path 112 extend in a direction spaced away from the branch section 114 with the branch section 114 as a start point.

The first medium path 111 is located on the first region 961 side and on the downstream side with respect to the branch section 114 in the transport direction of the paper P.

The second medium path 112 is located on the second region 962 side and on the downstream side with respect to the branch section 114 in the transport direction of the paper P.

The first medium path 111 has a linear portion 111A.

The linear portion 111A is provided in a form of extending in a direction spaced away from the plane 96H.

Further, the linear portion 111A is formed in a straight line shape and is disposed in a relationship intersecting the plane 96H. In the present exemplary embodiment, the linear portion 111A is disposed in a relationship orthogonal to the plane 96H.

Further, the first medium path 111 includes a connection section 111B that connects the linear portion 111A and the common path 113.

The connection section 111B has a curvature. The connection section 111B is provided in a form of being gradually spaced away from the plane 96H toward the linear portion 111A from the branch section 114.

The second medium path 112 also has a linear portion 112A.

The linear portion 112A is provided in a form extending in a direction spaced away from the plane 96H.

Further, the linear portion 112A is formed in a straight line shape and is disposed in a relationship intersecting the plane 96H. In the present exemplary embodiment, the linear portion 112A is disposed in a relationship orthogonal to the plane 96H.

Further, the second medium path 112 includes a connection section 112B that connects the linear portion 112A and the common path 113.

The connection section 112B has a curvature. The connection section 112B is provided in a form of being gradually spaced away from the plane 96H toward the linear portion 112A from the branch section 114.

Further, in the present exemplary embodiment, a connection path 116 that connects the first medium path 111 and the second medium path 112 is provided.

The connection path 116 is disposed in a relationship intersecting the plane 96H. More specifically, the connection path 116 is arranged in a relationship orthogonal to the plane 96H.

Further, the connection path 116 is formed in a straight line shape.

In a case in which the front and back sides of the paper P fed out from the first paper accommodation section 81 are reversed, the CPU 11*a* first transports the paper P to the second medium path 112, which is one medium path.

The CPU 11*a* controls the orientation of the switching member 86A so that the paper P fed out from the first paper accommodation section 81 heads for the second medium path 112.

In the present exemplary embodiment, the paper P is guided by the switching member 86A, and as a result, the paper P heads for the second medium path 112.

Then, the CPU 11*a* reverses the transport direction of the paper P transported to the second medium path 112. The CPU 11*a* reverses the transport direction after the rear end portion of the paper P, which is transported to the second medium path 112, in the transport direction passes through the switching member 86A.

The CPU 11*a* reverses the transport direction of the paper P by reversing the rotation direction of the upstream transport roll 95 shown in FIG. 1.

As a result, the paper P heads for the first medium path 111, which is the other medium path, through the connection path 116. Thereafter, the paper P passes through the first medium path 111 and heads for the secondary transfer section T2 shown in FIG. 1.

The paper P, which is transported from the first paper accommodation section 81 to the second medium path 112, heads for the first medium path 111 without passing through the common path 113.

The paper P transported to the second medium path 112, which is one medium path, does not head for the common path 113. The paper P transported to the second medium path 112 is transported to the first medium path 111, which is the other medium path, without passing through the common path 113.

The paper P, which is transported to the second medium path 112, is transported to the first medium path 111 through the connection path 116 without passing through the common path 113.

Then, the paper P passes through the first medium path 111 and heads for the secondary transfer section T2.

As described above, the first medium path 111 has the linear portion 111A. In addition, the second medium path 112 also has the linear portion 112A.

In the present exemplary embodiment, the linear portion 112A of the second medium path 112 is located on an extension line of the linear portion 111A of the first medium path 111.

Further, in the present exemplary embodiment, the connection path 116 formed in a straight line shape is located on an extension line of the linear portion 111A of the first medium path 111.

In the configuration example shown in FIG. 8, the second medium path 112 is also provided.

In the configuration example shown in FIG. 8, the second medium path 112 has the linear portion 112A. The linear portion 112A is provided in a form extending in a direction spaced away from the plane 96H.

Further, the second medium path 112 has an intersection portion 112C that is disposed in a relationship intersecting the linear portion 112A. The intersection portion 112C is located on the downstream side with respect to the linear portion 112A in an extension direction of the second medium path 112.

The "extension direction of the second medium path 112" here refers to the direction of extension in a direction spaced away from the branch section 114.

Others

In the above description, a case has been described in which the paper P is transported toward the paper accommodation section 80 that is another paper accommodation section located at a position farther from the image forming section 240 in a case in which the front and back sides of the paper P are reversed.

Specifically, for example, in the form shown in FIGS. 5 and 6, a case will be described in which the paper P is transported toward the fourth paper accommodation section 84 located at a portion farther from the image forming section 240.

The fourth paper accommodation section 84 is located at a portion farther from the image forming section 240 than the first paper accommodation section 81 in which the paper P that is the reversal target is accommodated.

However, the present invention is not limited to this, and the paper P that is the reversal target may be transported toward the paper accommodation section 80 located close to the image forming section 240.

Specifically, for example, the paper P fed out from the third paper accommodation section 83 shown in FIG. 8 may be transported toward the fourth paper accommodation section 84.

The fourth paper accommodation section 84 is the paper accommodation section 80 that is located closer to the image forming section 240 than the third paper accommodation section 83.

Although not described above, in the configuration example shown in FIG. 8, a third switching member 86C is provided.

In a case in which the paper P accommodated in the third paper accommodation section 83 is transported toward the fourth paper accommodation section 84, the third switching member 86C guides the paper P.

The third switching member 86C is used to transport the paper P fed out from the third paper accommodation section 83 toward the fourth paper accommodation section 84.

In this case, in a case in which the paper P reaches the front of the fourth paper accommodation section 84, the transport direction of the paper P is reversed. In addition, in a case in which the paper P reaches the front of the fourth paper accommodation section 84, an orientation of the third switching member 86C is switched.

Accordingly, the paper P after being reversed passes through the merging section 74 and heads for the secondary transfer section T2, as described above.

Further, in a case in which the front and back sides of the paper P are reversed, a destination to which the paper P is fed may be a path through which the paper P from another apparatus passes.

In the present exemplary embodiment, all of the destinations to which the paper P that is the reversal target is fed are paths through which the paper P from the paper accommodation section 80 provided in the image forming apparatus passes.

Depending on the configuration of the apparatus, a path through which the paper P passes from a paper accommodation section provided in the other apparatus (not shown) may be provided in the image forming apparatus 10 according to the present exemplary embodiment.

In a case in which the front and back sides of the paper P are reversed, the paper P that is the reversal target may be fed to the path through which the paper P fed out from the paper accommodation section 80 of the other apparatus passes.

In addition, in the above description, a case has been described in which the two reversal mechanisms are provided in one image forming apparatus 10.

One of the two reversal mechanisms is a reversal mechanism 63 that reverses the paper P that has passed through the secondary transfer section T2.

In addition, the other reversal mechanism of the two reversal mechanisms is the above-described mechanism that reverses the paper P on the upstream side with respect to the secondary transfer section T2.

Hereinafter, the mechanism that reverses the paper P on the upstream side with respect to the secondary transfer section T2 is referred to as an "upstream reversal mechanism".

Here, it is not necessary to provide the image forming apparatus 10 with the two reversal mechanisms, the reversal mechanism 63 and the upstream reversal mechanism. The installation of the reversal mechanism 63 may be omitted.

In addition, the one image forming apparatus 10 may be include two reversal mechanisms, the reversal mechanism 63 and the upstream reversal mechanism.

FIG. 10 is a diagram showing a comparative example.

In the comparative example shown in FIG. 10, a path indicated by reference numeral 10A is a path for reversal. This path is a dedicated path for the reversal.

In this case, the image forming apparatus 10 is more likely to increase in size than in the configuration according to the present exemplary embodiment described above.

In the present exemplary embodiment, as described above, the front and back sides of the paper P are reversed by using a path through which paper P other than the paper P that is the reversal target passes. In a case in which a dedicated path for the reversal is provided, the image forming apparatus 10 is more likely to increase in size than in the configuration according to the present exemplary embodiment.

In addition, in the comparative example shown in FIG. 10, the two disposition targets are concentrated on the first region 961 side, which is one of the two regions facing each other with the plane 96H interposed between the two regions.

In the comparative example shown in FIG. 10, both the image forming section 240 as the transport destination of the paper P and a space for reversing the front and back sides of the paper P are provided on the first region 961 side.

In the comparative example shown in FIG. 10, the first region 961 side is configured such that the image forming section 240 and the space for reversal are provided in a concentrated manner.

In this case, the volume of the apparatus is likely to increase on the first region 961 side that is one region side. Along with this, the entire image forming apparatus 10 is likely to increase in size.

On the other hand, in the present exemplary embodiment, a region on a side opposite to an installation side of the image forming section 240 that is a transport destination of the paper P is utilized. In the present exemplary embodiment, the region on the opposite side is used for the reversal of the front and back sides of the paper P. In this case, the increase in size of the image forming apparatus 10 can be easily suppressed.

Supplementary Note (((1)))

A recording medium transport device comprising:

a medium accommodation section that accommodates a recording medium;

a medium path that is a path through which the recording medium fed out from the medium accommodation section passes;

a merging path that merges with the medium path and that is a path through which the recording medium fed out from another accommodation section different from the medium accommodation section passes in a case of heading for the medium path; and a processor configured to transport the recording medium fed out from the medium accommodation section to an upstream side in the merging path through the merging path, reverse a transport direction of the recording medium, and transport the recording medium to the medium path.

(((2)))

The recording medium transport device according to (((1))), wherein the processor is configured to:

in a case in which the recording medium from the other accommodation section is not located on the merging path, transport the recording medium from the medium accommodation section to the merging path.

(((3)))

The recording medium transport device according to (((1))) or (((2))), wherein the processor is configured to:

in a case in which the recording medium from the medium accommodation section is transported to the merging path, prevent the recording medium from being fed out from the other accommodation section to the merging path.

(((4)))

The recording medium transport device according to any one of (((1))) to (((3))), wherein the medium path is provided to extend toward a downstream side in a feeding direction in a case in which the recording medium is fed out from the medium accommodation section, and extends toward one region side of two regions that face each other with a plane interposed between the two regions, the plane extending along the feeding direction and passing through the fed out recording medium, and the merging path extends from the other region side of the two regions toward the medium path.

(((5)))

The recording medium transport device according to (((4))), wherein the plane extends along a direction intersecting a vertical direction, the medium path extends toward a region side located on an upper side of the two regions that face each other with the plane interposed between the two regions, and the merging path extends from a region side located on a lower side with respect to the plane toward the medium path.

(((6)))

The recording medium transport device according to any one of (((1))) to (((5))), wherein, in addition to the medium accommodation section, the other accommodation section is provided and a plurality of accommodation sections that accommodate recording media are provided, the plurality of accommodation sections are arranged in an up-down direction, and the merging path is disposed beside the plurality of accommodation sections and is provided in a form along the up-down direction.

(((7)))

The recording medium transport device according to (((6))), wherein the merging path includes an up-down direction portion that is a portion extending along the up-down direction, and further includes an intersection direction portion that is connected to the up-down direction portion and that is disposed in a relationship intersecting the up-down direction portion.

(((8)))

The recording medium transport device according to any one of (((1))) to (((7))), wherein a feeding direction in a case in which the recording medium is fed out from the medium accommodation section and a feeding direction in a case in which the recording medium is fed out from the other accommodation section are aligned with each other, a position of the medium accommodation section and a position of the other accommodation section are different from each other in a direction intersecting the feeding direction, each of the medium accommodation section and the other accommodation section has a downstream end portion that is an end portion located on a downstream side in the feeding direction, and in comparison between positions in the feeding direction, the downstream end portion of the other accommodation section is located on an upstream side in the feeding direction with respect to the downstream end portion of the medium accommodation section.

(((9)))

The recording medium transport device according to any one of (((1))) to (((8))), wherein the processor is configured to:

transport the recording medium fed out from the medium accommodation section to the medium path to the merging path in a case in which a predetermined specific condition is satisfied, and transport the recording medium fed out from the medium accommodation section to the medium path to a downstream side through the medium path without transporting the recording medium to the merging path in a case in which the specific condition is not satisfied.

(((10)))

A recording medium transport device comprising:

an accommodation section that accommodates a recording medium;

a first medium path through which the recording medium fed out from the accommodation section passes and that is located on one region side of two regions that face each other with a plane interposed between the two regions, the plane extending along a feeding direction of the recording medium and passing through the fed out recording medium;

a second medium path through which the recording medium fed out from the accommodation section passes and that is located on the other region side of the two regions; and a processor configured to reverse a transport direction of the recording medium transported one medium path of the first medium path or the second medium path, and transport the recording medium, of which the transport direction is reversed, to the other medium path.

(((11)))

The recording medium transport device according to (((10))), further comprising:

a common path that is a path through which the recording medium heading for the first medium path and the second medium path passes, wherein the recording medium transported to the one medium path is transported to the other medium path without passing through the common path.

(((12)))

The recording medium transport device according to (((11))), wherein each of the first medium path and the second medium path has a linear portion that extends toward a direction spaced away from the plane and that is formed in a straight line shape, and the linear portion of the second medium path is located on an extension line of the linear portion of the first medium path.

(((13)))

The recording medium transport device according to any one of (((10))) to (((12))), wherein the one medium path has a linear portion that extends in a direction spaced away from the plane and that is formed in a straight line shape, and an intersection portion that is located on a downstream side with respect to the linear portion in an extension direction of the one medium path and that is disposed in a relationship intersecting the linear portion.

(((14)))

An image forming apparatus comprising:

a recording medium transport device that transports a recording medium; and an image forming section that forms an image on the recording medium transported by the recording medium transport device, wherein the recording medium transport device has a configuration of the recording medium transport device according to any one of (((1))) to (((13))).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium transport device comprising:

a medium accommodation section that accommodates a recording medium;

a medium path that is a path through which the recording medium fed out from the medium accommodation section passes;

a merging path that merges with the medium path and that is a path through which the recording medium fed out from another accommodation section different from the medium accommodation section passes in a case of heading for the medium path; and a processor configured to transport the recording medium fed out from the medium accommodation section to an upstream side in the merging path through the merging path, reverse a transport direction of the recording medium, and transport the recording medium to the medium path.

2. The recording medium transport device according to claim 1, wherein the processor is configured to:

in a case in which the recording medium from the other accommodation section is not located on the merging path, transport the recording medium from the medium accommodation section to the merging path.

3. The recording medium transport device according to claim 1, wherein the processor is configured to:

in a case in which the recording medium from the medium accommodation section is transported to the merging path, prevent the recording medium from being fed out from the other accommodation section to the merging path.

4. The recording medium transport device according to claim 1, wherein the medium path is provided to extend toward a downstream side in a feeding direction in a case in which the recording medium is fed out from the medium accommodation section, and extends toward one region side of two regions that face each other with a plane interposed between the two regions, the plane extending along the feeding direction and passing through the fed out recording medium, and the merging path extends from the other region side of the two regions toward the medium path.

5. The recording medium transport device according to claim 4, wherein the plane extends along a direction intersecting a vertical direction, the medium path extends toward a region side located on an upper side among the two regions that face each other with the plane interposed between the two regions, and the merging path extends from a region side located on a lower side with respect to the plane toward the medium path.

6. The recording medium transport device according to claim 1, wherein, in addition to the medium accommodation section, the other accommodation section is provided and a plurality of accommodation sections that accommodate recording media are provided, the plurality of accommodation sections are arranged in an up-down direction, and the merging path is disposed beside the plurality of accommodation sections and is provided in a form along the up-down direction.

7. The recording medium transport device according to claim 6, wherein the merging path includes an up-down direction portion that is a portion extending along the up-down direction, and further includes an intersection direction portion that is connected to the up-down direction portion and that is disposed in a relationship intersecting the up-down direction portion.

8. The recording medium transport device according to claim 1, wherein a feeding direction in a case in which the recording medium is fed out from the medium accommodation section and a feeding direction in a case in which the recording medium is fed out from the other accommodation section are aligned with each other, a position of the medium accommodation section and a position of the other accommodation section are different from each other in a direction intersecting the feeding direction, each of the medium accommodation section and the other accommodation section has a downstream end portion that is an end portion located on a downstream side in the feeding direction, and in comparison between positions in the feeding direction, the downstream end portion of the other accommodation section is located on an upstream side in the feeding direction with respect to the downstream end portion of the medium accommodation section.

9. The recording medium transport device according to claim 1, wherein the processor is configured to:

transport the recording medium fed out from the medium accommodation section to the medium path to the merging path in a case in which a predetermined specific condition is satisfied, and transport the recording medium fed out from the medium accommodation section to the medium path to a downstream side through the medium path without transporting the recording medium to the merging path in a case in which the specific condition is not satisfied.

10. A recording medium transport device comprising:

an accommodation section that accommodates a recording medium;

a first medium path through which the recording medium fed out from the accommodation section passes and that is located on one region side of two regions that face each other with a plane interposed between the two regions, the plane extending along a feeding direction of the recording medium and passing through the fed out recording medium;

a second medium path through which the recording medium fed out from the accommodation section passes and that is located on the other region side of the two regions; and a processor configured to reverse a transport direction of the recording medium transported one medium path of the first medium path or the second medium path, and transport the recording medium, of which the transport direction is reversed, to the other medium path.

11. The recording medium transport device according to claim 10, further comprising:

a common path that is a path through which the recording medium heading for the first medium path and the second medium path passes, wherein the recording medium transported to the one medium path is transported to the other medium path without passing through the common path.

12. The recording medium transport device according to claim 11, wherein each of the first medium path and the second medium path has a linear portion that extends toward a direction spaced away from the plane and that is formed in a straight line shape, and the linear portion of the second medium path is located on an extension line of the linear portion of the first medium path.

13. The recording medium transport device according to claim 10, wherein the one medium path has a linear portion that extends in a direction spaced away from the plane and that is formed in a straight line shape, and an intersection portion that is located on a downstream side with respect to the linear portion in an extension direction of the one medium path and that is disposed in a relationship intersecting the linear portion.

14. An image forming apparatus comprising:

a recording medium transport device that transports a recording medium; and an image forming section that forms an image on the recording medium transported by the recording medium transport device, wherein the recording medium transport device has a configuration of the recording medium transport device according to claim 1.

15. A recording medium transport device comprising:

a medium accommodation section that accommodates a recording medium;

a medium path that is a path through which the recording medium fed out from the medium accommodation section passes;

a merging path that merges with the medium path and that is a path through which the recording medium fed out from another accommodation section different from the medium accommodation section passes in a case of heading for the medium path; and means for transporting the recording medium fed out from the medium accommodation section to an upstream side in the merging path through the merging path, reversing a transport direction of the recording medium, and transporting the recording medium to the medium path.

* * * * *